US006279026B1

(12) United States Patent
Clarke et al.

(10) Patent No.: US 6,279,026 B1
(45) Date of Patent: Aug. 21, 2001

(54) TIMEOUT OBJECT FOR OBJECT-ORIENTED, REAL-TIME PROCESS CONTROL SYSTEM AND METHOD OF OPERATION THEREOF

(75) Inventors: Thomas A. Clarke; Ellen B. Hawkinson, both of Phoenix; Ziad M. Kaakani; Christian R. Thomas, both of Scottsdale, all of AZ (US)

(73) Assignee: Honeywell International INC, Morristown, NJ (US)

( * ) Notice: Subject to any disclaimer, the term of this patent is extended or adjusted under 35 U.S.C. 154(b) by 0 days.

(21) Appl. No.: 09/205,769

(22) Filed: Dec. 4, 1998

(51) Int. Cl.[7] ................................... G06F 9/00
(52) U.S. Cl. .................... 709/102; 709/201; 709/203
(58) Field of Search ..................... 709/100, 101, 709/102, 104, 107, 108, 206, 201, 310; 701/1, 200

(56) References Cited

U.S. PATENT DOCUMENTS

| 5,333,265 | * | 7/1994 | Orimo ............................ 709/201 |
| 5,652,911 | * | 7/1997 | Van Venrooy ...................... 701/1 |
| 5,726,984 | * | 3/1998 | Kubler ............................. 370/349 |
| 5,860,020 | * | 1/1999 | Van Venrooy ..................... 712/28 |

OTHER PUBLICATIONS

Fraga, J., Et Al.: "A Programming Model For Real–Time Applications In Open Distributed Systems," Proceedings Of The Fifth IEEE Computer Society Workshop On Future Trends Of Distributed Computing Systems (Cat. No. 95TB8106), Cheju Island, SOU, Aug. 28–30, 1995, pp. 104–111, XP002138879, 1995, Los Alamitos, CA, USA, IEEE Comput. Soc. Press, USA ISBN: 0–8186–7125–4, IEL Online Library.

Chen, Y–J, Et Al.: "An Object–Based Model For Dependable Real–Time Distributed Systems," Proceedongs Of Words'96. The Second Workshop On Object–Oriented Real–Time Dependable Systems (Cat. No. 96TB100036), Laguna Beach, CA, USA, Feb. 1–2, 1996, pp. 192–200, XP002138880, Los Alamitos, CA, USA IEEE Comput. Soc. Press, USA ISBN: 0–8186–7570–5, IEL Online Library.

Moon Hae Kim, Et Al.: "Modeling Of A Highly Reliable Real–Time Distributed System Using The RKO.k Model And The Monitor Object," Proceedings: Third International Workshop On Object–Oriented Real–Time Dependable Systems (Cat. No. 97TB100132), Proceedings Third International On Object–Oriented Real–Time Depenable Systems, Newport Beach, CA, USA, Feb. 5–7, 1997, pp. 48–55, XP002138881, 1997, Los Alamitos, CA USA, IEEE Comput. Soc., USA ISBN: 0–8186–8046–6, IEL Online Library.

* cited by examiner

Primary Examiner—Majid Banankhah
(74) Attorney, Agent, or Firm—Hitt Gaines & Boisbane

(57) ABSTRACT

For use in time-limiting a request for information from a client to a resource, a timeout object, a method of operating the same and a real-time process control system employing the timeout object or the method. In one embodiment, the timeout object includes: (1) a client interface that receives, from the client, the request and a time-based parameter and (2) a resource interface that forwards the request to the resource and waits for the information an amount of time that is a function of the time-based parameter, the client interface: (2a) returning the information to the client if the timeout object receives the information within the amount of time and (2b) returning a timeout indicator to the client if the timeout object fails to receive the information within the amount of time.

7 Claims, 5 Drawing Sheets

TIMEOUT OBJECT FOR OBJECT-ORIENTED, REAL-TIME PROCESS CONTROL SYSTEM AND METHOD OF OPERATION THEREOF

TECHNICAL FIELD OF THE INVENTION

The present invention is directed, in general, to process control systems employing object-oriented software and, more specifically, to a timeout object for an object-oriented real-time process control system and a method of operating the same.

BACKGROUND OF THE INVENTION

Real-time process control systems were first implemented within a single computer system. As the need to monitor and control more physical devices increased, the complexity and size of the process control systems also increased. Shortly thereafter, single computer real-time process control systems were unable to process all the information within a timely manner as required by the real-time process control environments.

To correct this processing problem, real-time process control systems evolved into multiple computer systems that were connected to each other with proprietary communication interfaces. The multiple computer systems processed data locally and communicated the information to the other computer systems over the proprietary communication interfaces. Since, the computer systems did not use a standard communication interface nor a standard protocol between each of the computer systems, modifications and additions to the systems were difficult, if not impossible.

This inter-computer incompatibility problem was resolved when the computer industry developed standardized networks and network protocols. Two of the industry standards were Ethernet and Transmission Control Protocol/ Internet Protocol ("TCP/IP") used on 10 base 2 coaxial cable. Ethernet and TCP/IP allowed various computer systems the ability to communicate to each other without using proprietary communication interfaces.

The next evolution in real-time process control systems was object oriented distributed processing. In object oriented distributed processing, requesting programs ("clients") call resource programs ("objects") to process a request. In this design, the clients and objects are located on different computers on the network. To facilitate a standardized way for clients to locate and communicate with objects, Microsoft Corporation developed the Component Object Model ("COM") protocol. The COM protocol, incorporated into software libraries called "COM libraries," defines a standardized interface for locating and communicating to objects over the network without requiring the clients to know the location of the desired objects.

The process control industry incorporated the COM standard and Object Linking and Embedding ("OLE") in its real-time process control standard, calling the resulting standard OLE for Process Control ("OPC"). The OPC standard defined the interface and architecture for distributed real-time process control object processing.

One of the original requirements of all real-time process control systems was the processing of requests within a specific period of time. If the real-time process control system failed to process the request within a specific period of time, the real-time process control system could have caused damage when the real-time process control system failed to control a physical device. Therefore, the real-time process control software was required to execute requests within specific time limitations.

However, even though the new OPC and COM standards used the standard network protocol processing features, the standard network protocols did not allow programs to control requests based upon time. If the computer which contained the object died or was not available, the standard network protocols suspended execution indefinitely or for a very long time. Thus, the new OPC and COM standards did not meet the basic time processing requirements of real-time process control systems.

Real-time process control systems cannot afford to be suspended indefinitely if they use OPC or COM compliant programs. What is needed in the art is a way to prevent clients and objects from suspending indefinitely or suspending for a long period of time.

SUMMARY OF THE INVENTION

To address the above-discussed deficiencies of the prior art, the present invention provides, for use in time-limiting a request for information from a client to a resource, a timeout object, a method of operating the same and a real-time process control system employing the timeout object or the method. In one embodiment, the timeout object includes: (1) a client interface that receives, from the client, the request and a time-based parameter and (2) a resource interface that forwards the request to the resource and waits for the information an amount of time that is a function of the time-based parameter, the client interface: (2a) returning the information to the client if the timeout object receives the information within the amount of time and (2b) returning a timeout indicator to the client if the timeout object fails to receive the information within the amount of time.

The present invention therefore introduces the broad concept of interposing an intermediary object between a client and a resource to channel requests and information flowing between the client and the resource to allow time-limits to be placed on the requests. This avoids the unacceptably long wait that can occur in prior art systems by virtue of their lack of timeout control.

In one embodiment of the present invention, the timeout indicator indicates whether the resource was available to provide the information. In a related embodiment, the timeout indicator indicates whether the resource successfully processed the request. The timeout indicator may therefore assume different values representing codes for such conditions.

In one embodiment of the present invention, the amount of time terminates when the timeout object receives the information from the resource. In an embodiment to be illustrated and described, the time-based parameter may be set to a null value. This charters the timeout object to wait an indefinite amount of time (subject to other kinds of timeout) until the resource returns the information.

In one embodiment of the present invention, the client interface is capable of receiving a subsequent request from the client to extend the amount of time. In an embodiment to be illustrated and described, the client may generate the subsequent request to extend the amount of time in response to receipt of a timeout indicator indicating that the resource is processing the earlier request, but did not return information within the originally-allotted amount of time.

In one embodiment of the present invention, the timeout object is a Component Object Module (COM)-compliant object. In a related embodiment, the resource is an Object Linking and Embedding (OLE) for Process Control (OPC)- compliant object. Those skilled in the pertinent art are familiar with OPC and COM in general and are aware of their shortcomings with respect to time-limited requests. The present invention, while serving as a useful extension to OPC and COM to permit time-limited requests, is also quite useful for providing the capability of time-limited requests in other object-oriented environments.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
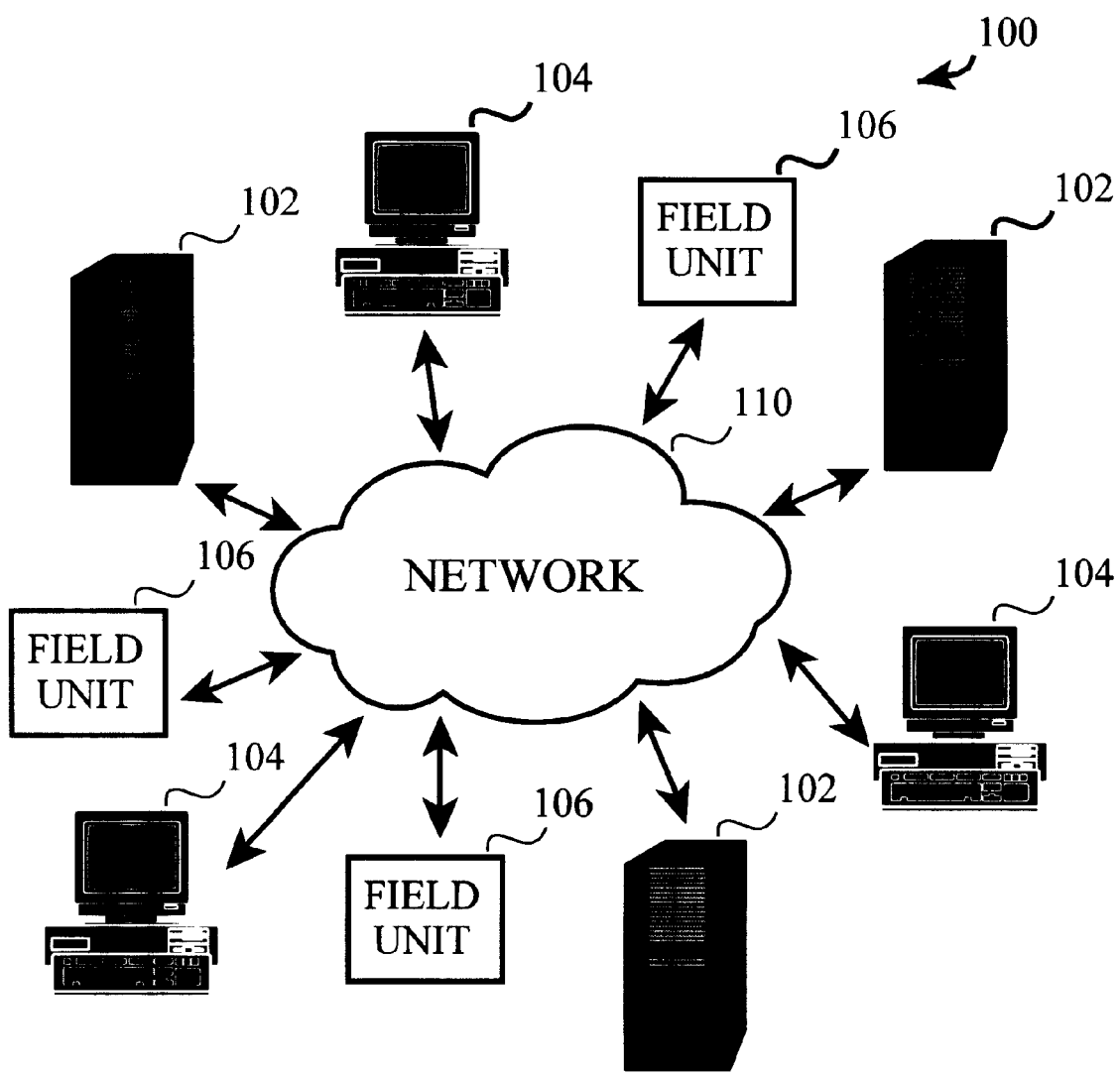
FIG. 1 illustrates a block diagram of a real-time process control system that forms one environment within which the present invention can operate.

Referring initially to FIG. 1, illustrated is a block diagram of a real-time process control system, generally designated 100, that forms one environment within which the present invention can operate. The real-time process control system 100 comprises a network 110 that interconnects a server 102, an operator interface 104 and a field unit 106. In the illustrated embodiment of the present invention, the real-time process control system 100 may comprise any number of servers 102, operator interfaces 104 and field units 106.

The network 110 comprises an industry standard network and industry standard network protocols. In the illustrated embodiment, the industry standard network is "10 base T," employing twisted pair cables. Other embodiments of the present invention use other networks comprising "10 base 2" employing coaxial cables, fiber optic cables or a combination of the two. Wireless communications may also be used for all or part of the network communications. The industry standard network protocols, in one embodiment of the present invention, are ETHERNET® and Transmission Control Protocol/Internet Protocol ("TCP/IP").

The server 102 comprises software programs that monitor, process information, and control the physical devices within the real-time process control system 100. The software programs comprise a requesting program "client," and a resource program "object" and other miscellaneous programs. The client program sends requests to object programs to perform specific functions. The object programs receive requests and perform the appropriate functions based upon the type of requests sent. The client programs and object programs communicate over the network 110 or internally within the server 102.

The operator interface 104 comprises a computer and a display. The operator interface 104 displays information concerning the current state of the system 100. The operator interface 104 also accepts operator input to perform functions such as controlling a physical device or requesting other information to be displayed on a display associated with the operator interface 104. The operator interface 104 may comprise both client programs and object programs. The operator interface 104 communicates to other programs over the network 110.

The field unit 106 comprises object programs that perform tasks related to the physical devices that make up the real-time process control system 100. In one embodiment of the present invention, the field unit's object programs collect status information, process data and control the physical devices. In other embodiments, the field unit 106 may perform more or less functions than described above. The field unit 106 responds to client's requests over the network 110.

Figure 2:
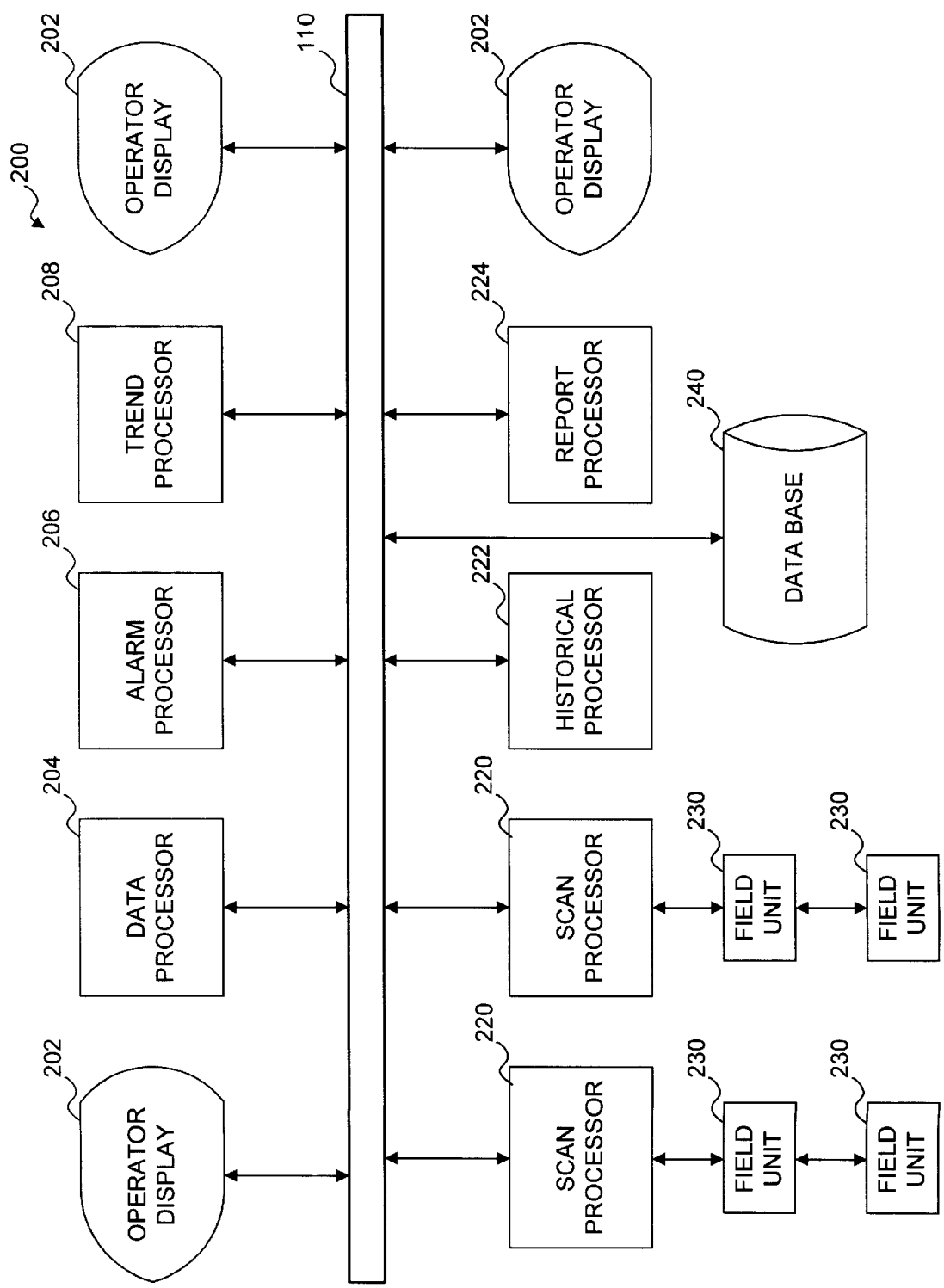
FIG. 2 illustrates a block diagram of a real-time process control software architecture.

Turning now to FIG. 2, illustrated is a block diagram of a real-time process control software architecture, generally designated 200. The real-time process control software architecture 200 comprises an operator display software 202, a data processor software 204, an alarm processor software 206, a trend processor software 208, a scan processor software 220, a historical processor software 222, a report processor software 224, a field unit software 230, a database software 240 and the network 110 of FIG. 1. In the illustrated embodiment of the present invention, the real-time process control software architecture 200 may comprise a plurality of the above software types.

The operator display software 202 displays the real-time process control system 100 information on a display or a plurality of displays. The operator display software 202 also processes the operator requests and communicates to other real-time process control software over the network 110.

The data processor software 204 processes the data collected and the data generated from the real-time process control system 100. The data processor software 204 stores and retrieves data to the database software 240 and communicates to other real-time process control software over the network 110.

The alarm processor software 206 performs alarm processing on the data collected. The alarm processor software 206 notifies the operator display software 202 and the report processor software 224 of any alarm conditions or non-alarm conditions that exist in the real-time process control system 100. The alarm processor software 206 also stores and retrieves information from the database software 240 over the network 110.

The trend processor software 208 performs trending functions for the real-time process control system 100. The trend processor software will collect operator selected data, generate the desired trend information and distribute the trend data to the operator display software 202 and the database software 240 over the network 110.

The scan processor software 220 collects data from a plurality of field units 230 and converts the data into the appropriate form usable by the real-time process control system 100. The scan processor software 220 distributes, over the network 110, the collected data to the other software processors so the software processors can perform their associated functions. The scan processor software 220 also stores and retrieves information from the database software 240.

The field unit 230 collects the specific data from the physical devices attached to the field unit 230. The physical devices are not shown since there are multitude of physical devices that can be monitored by a real-time process control system. The field unit 230 sends the physical device data to the scan processor software 220. The field unit 230 also processes control requests.

The historical processor software 222 collects and processes historical information about the real-time process control system 100. The historical processor software 222 also performs archival functions and stores information to the database software 240.

The report processor software 224 generates the reports for the real-time process control system 100. The report processor software 224 sends the generated reports to the operator display software 202, the historical processor software 222, the database software 240 and to printing devices if attached to the system 100.

The database software 240 processes all request for retrieval and storage of information for the real-time process control system 100. In other embodiments of the present invention, the system 100 comprises a plurality of database software units contained on a plurality of computers.

Those skilled in the art should know that other embodiments of the present invention may include a plurality of processing software described above. Also, other embodiments of the present invention may include more or less processing software types and contain more or less functional capabilities then described above.

Figure 3:
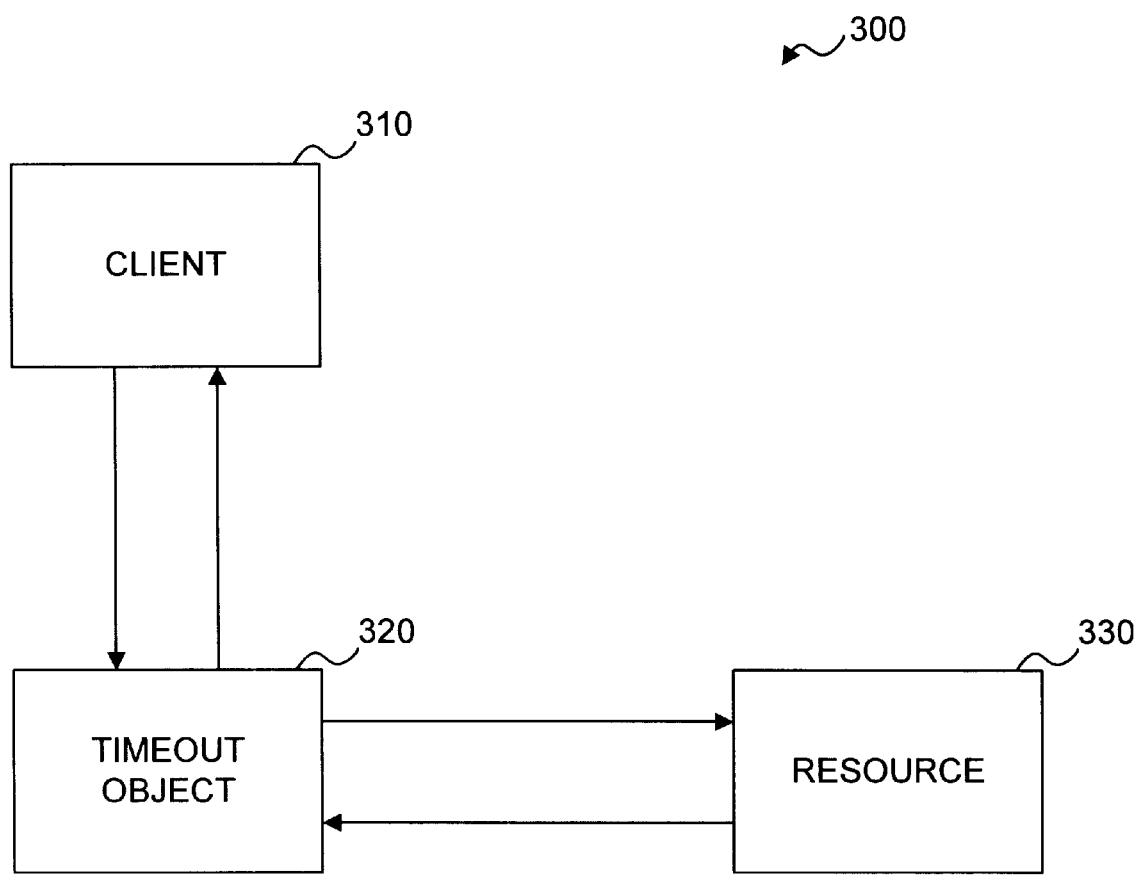
FIG. 3 illustrates a block diagram of a client, a resource and a timeout object constructed according to the principles of the present invention.

Turning now to FIG. 3, illustrated is a block diagram of a client 310, a resource 330 and a timeout object 320 constructed according to the principles of the present invention. The client 310 is a software program that sends a request to the resource 330 to perform some function. The resource 330 receives requests, performs a specific function and returns the results of the function performed to the client 310.

Prior to the present invention, the client 310 would send a request directly to the resource 330. Then the client 310 suspends execution until the resource completes the required function. If the resource 330 never completes the required function or the resource 330 terminates for some reason, then the client 310 will be suspended indefinitely or until the network protocol software times out after a long period of time.

In the illustrated embodiment of the present invention, the client 310 uses a timeout object 320 to prevent the client 310 from suspending forever or for a long period of time. First, the client 310 sends a request to the timeout object 320. The timeout object 320 creates a thread. A thread is a Microsoft Windows® NT operating system feature that allows a separate flow of execution within the same program. Background information concerning threads is discussed in *Multithreaded Programming Guide*, by Sun Microsystems, Inc., Sun Microsystems 1994 and in *Threaded Models*, by Microsoft Corp., Microsoft Developer Network CD-ROM, Jan. 1998. The foregoing publications are incorporated herein by reference.

Once the thread is created, the thread sends the client's 310 request to the resource 330 and waits for a response. At the same time, the timeout object 320 waits for a period of time specified by the client 310. Upon completion of the request or expiration of the timeout period, the timeout object 320 returns execution control to the client 310. The timeout object 320 also returns a status indicating if the request completed or the timeout period expired before completion. The returned status also indicates if the resource was not found, if the resource ceased operation while completing the request, or if the timeout object was unable to gain access to the network. In other embodiments of the present invention, the timeout object 320 may return more or less information to the client 310.

If the client 310 received a status indicating that a timeout occurred, then the client 310 can initiate another request to the timeout object 320 to check on the status of the previous request. In other embodiments of the present invention, the timeout object 320 may perform more functions than those described above.

Table 3–1 shows an example of the pseudo code for a timeout object.

TABLE 3-1

Timeout Pseudo code

For each untimed method, the timeout object or code will have a corresponding timeout method and a timeout thread to perform the call on behalf of the client. There will also be an associated structure with each method to pass parameters between the timed method and timeout thread. This pseudo code represents a snapshot of the required timeout code to support an untimed method. There is also a host of supporting code such as:
idl (interface definition language) - which represents the interface for COM remoting.
VB support - In other words, for every timed method and associated thread function, there is another chunk of code, which also has a timed method with an associated thread function to support the VB flavor of all calls.
Threading model identification - There is code in place through out the code to identify if the client is either free threaded (multi threaded) or apartment threaded (single threaded). Depending on the model, various interface pointers need to be marshaled between methods and threads.
Status - Helper code to determine if the actual call has completed with the results available for consumption by the client.
struct MethodInfo
{
    DWORD    dwMethodID;    //constant to identifier method
    CHciTimeout    *pThis;    //pointer to timeout object
    CCriticalSection    *csTimeout;    //critical section to protect data
    HANDLE    hEvent;    //Event to coordinate timeout
    DWORD    dwTransID;    //transaction id to indicate
                                                //completion status
    BOOL    bCleanupResults;    //indicator as to whether the
                                                //timeout object is responsible
                                                //for cleanup
    IStream    *pstInterfacePtr;    //must marshal the interface
                                                //pointer if Apartment threaded
    HRESULT    hResult;    //result of actual call
    InterfaceX    *pIf;    //pointer to the actual interface
                                                //within the server
    whateverType    MethodParamx;    //method specific parameter for
                                                //actual call
};
MethodThread( MethodInfo )
{
    Check threading model and take appropriate actions
    Make call to actual method within the server
    The following is constructed from the MethodInfo structure
    hResult = pIf->Method ( MethodParamX );
    if receive an RPC (remote procedure call) error then
        indicate that the server is not responding by setting the status
        to E_ABORT
    Protect data
        Check status of timeout within the main method using
        Transaction ID
        Copy returned data and status to appropriate location
        depending on status
        If not timedout, then
            signal the method that the information is available TABLE 3-1-continued Timeout Pseudo code

```
        Set Status to completed using Transaction ID
    End Protect data
    Cleanup
}
Method( InterfaceX *pIf,          //in parameter, pointer to actual
                                  //interface in server
         DWORD      dwTimeout,    //in parameter, duration of
                                  //timeout in milliseconds
         DWORD      *dwTransID,   //in/out parameter, transaction
                                  //id, used to identify request.
         whateverType MethodParamX ) //method specific parameters
                                  //1..n
{
    Test transaction ID
    If a request to see if the call has completed after at least 1 timeout,
    then
        If completed, then
            retrieve the returned data (from thread) as well as
results
            set transaction ID to zero
    Else if new timed request, then
        Get a new unique transaction ID
        Create a new Event, to be used to signal when the timeout
            has expired.
        Package info into MethodInfo structure
        If the timeout value is zero, then
            call the MethodThread as a function, not a new thread
            This indicates that the call will be blocking and act as a
            normal untimed call
        Else
            Spawn the MethodThread as a new thread
        End if
        Wait for timeout or signal from thread that it has completed
        If timeout or timer expired then
            Set the status to E_PENDING
        Else
            Thread completed before timeout
            retrieve the returned data (from thread) as well as
results
            set transaction ID to zero
        End if
    Else
        Bad transaction ID
    End if
    Clean up
}
```

Figure 4A:
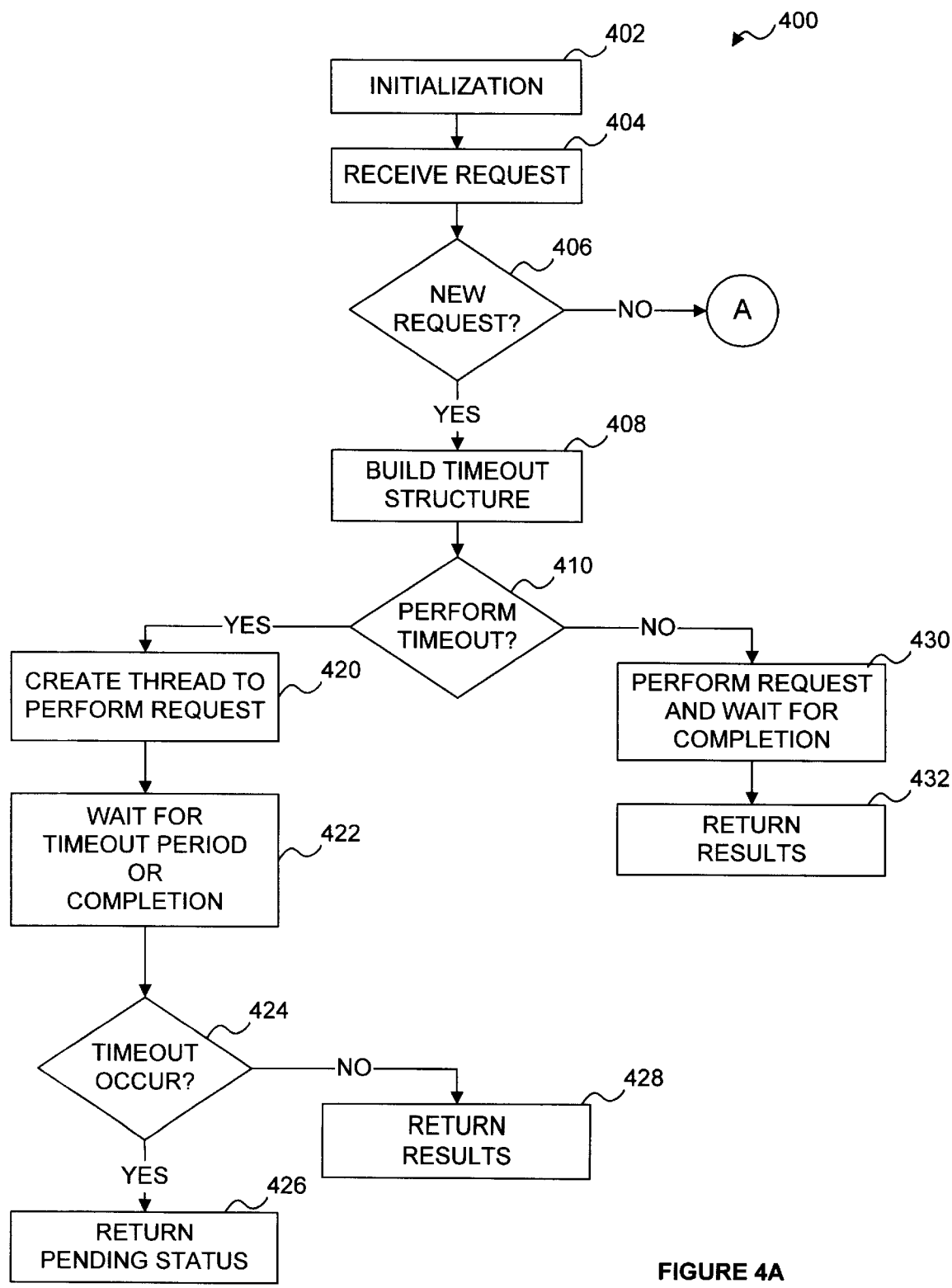
FIGS. 4A and 4B illustrate a flow diagram of a method of time-limiting a request from the client of FIG. 3 to the resource of FIG. 3.
Figure 4B:
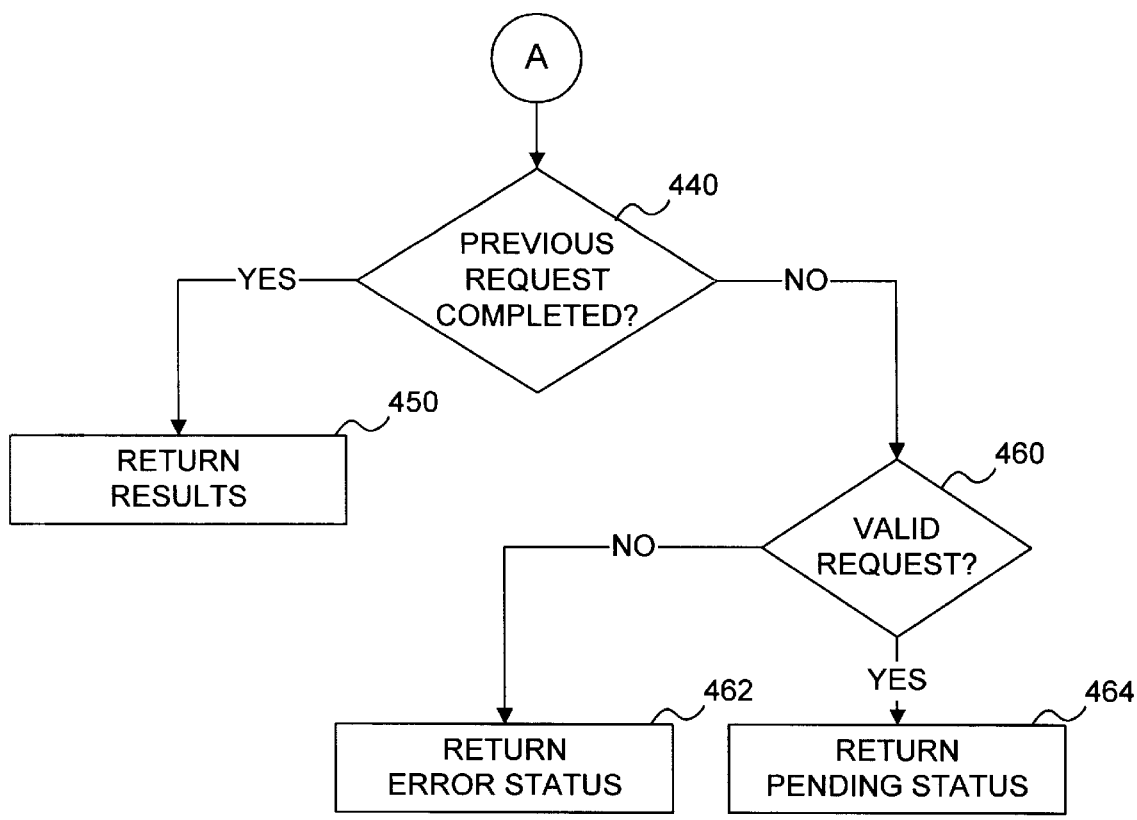

Turning now to FIG. 4A and FIG. 4B, illustrated is a flow diagram of a method of time-limiting a request from the client 310 of FIG. 3 to the resource 330 of FIG. 3. In FIG. 4, the timeout object 320 first performs initialization in a step 402.

After initialization, the timeout object 320 receives the client's 310 request to be processed in a step 404. In one embodiment of the present invention, the timeout object 320 processes new requests and pending requests. The timeout object 320 determines if the request is a new request in a decisional step 406.

If the request is a new request, the timeout object 320 builds a timeout structure used to keep track of information associated with the particular request in a step 408. The timeout object 320 then determines if the request is to be a timed request in a decisional step 410.

If the request is a timed request, then the timeout object 320 creates a thread and the thread performs the request in a step 420. The timeout object 320 then waits until the specified timeout period expires or until the thread completes the client's request in a step 422.

Next, the timeout object 320 determines if the timeout period expired before completing the request in a decisional step 424. If the timeout period expired, then the timeout object 320 returns to the client 310 a status indicating the request is still pending in a step 426. If the timeout period has not expired, then the request has completed. Then the timeout object 320 obtains the results from the thread and returns the results to the client 310 in a step 428.

If the request is not a timed request, then the timeout object 320 performs the request and waits for the request to complete in a step 430. During this wait period, the client 310 suspends until the timeout object 320 completes the request. Once the timeout object 320 completes the request, the timeout object 320 sends the results of the request to the client 310 in a step 432.

The timeout object 320 also processes requests that are pending. The timeout object 320 determines if the request is a pending request in the decisional step 406. If the request to be processed is a pending request, the timeout object 320 checks if the pending request has completed in a decisional step 440. (See FIG. 4B).

If the pending request has completed, then the timeout object 320 obtains the results from the thread and returns the results to the client 310 in a step 450. If the pending request has not completed, then the timeout object 320 determines whether the request is a valid request in a decisional step 460.

If the request is valid, then the timeout object 320 returns a status to the client 310 indicating that the request is still pending in a step 464. If the request is invalid, then the timeout object 320 returns a status to the client 310 indicating an error has occurred.

From the above, it is apparent that the present invention provides, for use in time-limiting a request for information from a client to a resource, a timeout object, a method of operating the same and a real-time process control system employing the timeout object or the method. In one embodiment, the timeout object includes: (1) a client interface that receives, from the client, the request and a time-based parameter and (2) a resource interface that forwards the request to the resource and waits for the information an amount of time that is a function of the time-based parameter, the client interface: (2a) returning the information to the client if the timeout object receives the information within the amount of time and (2b) returning a timeout indicator to the client if the timeout object fails to receive the information within the amount of time.

Although the present invention has been described in detail, those skilled in the art should understand that they can make various changes, substitutions and alterations herein without departing from the spirit and scope of the invention in its broadest form.

What is claimed is:

1. A real-time process control system, comprising:
    a computer system;
    a plurality of sensors and controllable devices;
    a data bus coupling said computer system to said plurality of sensors and controllable devices, said plurality of sensors and controllable devices representing resources for said computer system;
    a client, associated with said computer system and capable of generating a request for information from one of said resources; and
    a timeout object for time-limiting said request that includes:
        a client interface that receives, from said client, said request and a time-based parameter, and
        a resource interface that forwards said request to said one of said resources and waits for said information an amount of time that is a function of said time-based parameter, said client interface:

returning said information to said client if said timeout object receives said information within said amount of time, and returning a timeout indicator to said client if said timeout object fails to receive said information within said amount of time.

2. The process control system as recited in claim 1 wherein said timeout indicator indicates whether said one of said resources was available to provide said information.

3. The process control system as recited in claim 1 wherein said timeout indicator indicates whether said one of said resources successfully processed said request.

4. The process control system as recited in claim 1 wherein said amount of time terminates when said timeout object receives said information from said one of said resources.

5. The process control system as recited in claim 1 wherein said client interface is capable of receiving a subsequent request from said client to extend said amount of time.

6. The process control system as recited in claim 1 wherein said timeout object is a Component Object Module (COM)-compliant object.

7. The process control system as recited in claim 1 wherein said one of said resources is an Object Linking and Embedding (OLE) for Process Control (OPC)-compliant object.

* * * * *